(Model.)

P. D. HORN.
Churn.

No. 237,868. Patented Feb. 15, 1881.

Witnesses:
A. H. Krause
Fred. G. Dieterich

Inventor:
Peter D. Horn,
by C. A. Brow & Co.
Attys.

UNITED STATES PATENT OFFICE.

PETER D. HORN, OF ARCADIA, INDIANA, ASSIGNOR OF ONE-HALF TO JAMES K. HERSHMAN AND CHRISTOPHER C. WHITE, OF SAME PLACE.

CHURN.

SPECIFICATION forming part of Letters Patent No. 237,868, dated February 15, 1881.

Application filed September 15, 1880. (Model.)

*To all whom it may concern:*

Be it known that I, PETER D. HORN, of Arcadia, in the county of Hamilton and State of Indiana, have invented certain new and useful Improvements in Churns; and I do hereby declare that the following is a full, clear, and exact description of the invention, which will enable others skilled in the art to which it appertains to make and use the same, reference being had to the accompanying drawings, which form a part of this specification.

Figure 1:
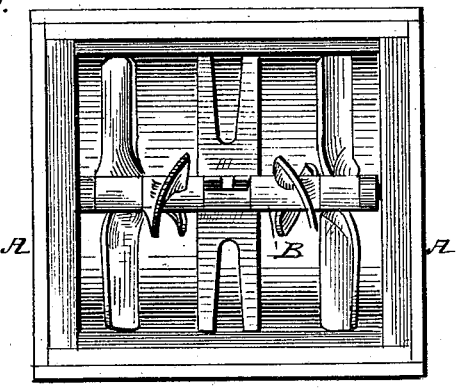
Figure 2:
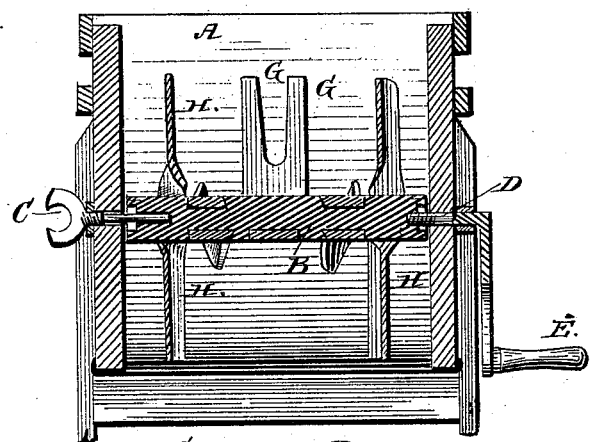
Figure 3:
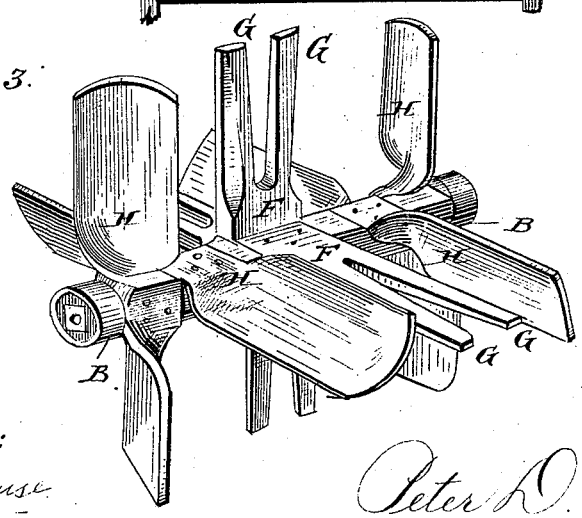

Figure 1 is a top view, Fig. 2 is a vertical sectional view, and Fig. 3 is a perspective view of the dasher detached from the churn.

Corresponding parts in the several figures are denoted by like letters of reference.

This invention relates to that class of churns which have a horizontal rotating dasher; and it consists in certain improvements in the construction of the same, which will be hereinafter more fully described, and particularly pointed out in the claim.

In the drawings hereto annexed, A represents the body of the churn, which is, by preference, semi-cylindrical in shape.

B is a horizontal shaft, mounted in the side of the churn-body A in the following manner:

C is a set-screw, placed in a threaded opening in one of the sides of the churn-body, and having an unthreaded stem entering a recess in one end of the shaft, which is therefore capable of turning thereon.

D is a stem, mounted in a bearing in the opposite end of the churn-body, having a crank, E, by which it may be turned, and provided at its extreme end with a thread formed in a direction opposite to the thread of the set-screw C, and entering a threaded recess in the opposite end of the dasher-shaft. By this construction and arrangement it will be seen that the dasher-shaft, while safely mounted, is capable of being turned by the crank E without danger of dislocating the screws upon which it is mounted.

Centrally upon the dasher-shaft are mounted blades or wings F, forked, as shown, so as to form fingers G. Upon the ends of the shaft adjoining the said forked blades are secured wings H H, twisted in such a direction as to throw the milk or cream toward the center of the churn, the wings on opposite sides being twisted or turned in opposite directions, as shown. The beaters are arranged in line with each other on all four sides of the shaft, and in equal numbers thereon.

The operation and advantages of my invention will be readily understood from the foregoing description, and by reference to the drawings hereto annexed.

When the dasher is rotated the cream is thrown from both ends to the center of the churn, thus thoroughly cutting, stirring, and breaking the cream, the butter thus produced being gathered by the central fingered blades, F.

My improved churn is simple, convenient, easily operated, and may be easily taken apart for cleaning or other purposes.

Having thus described my invention, I claim and desire to secure by Letters Patent of the United States—

A horizontal rotating dasher-shaft, B, having the central bifurcated beaters, F, and the twisted beaters H on each side thereof, and at the ends of the shaft, said beaters F H arranged in line with each other on all four sides of the shaft, and in equal numbers thereon, as shown and described.

In testimony that I claim the foregoing as my own I have hereto affixed my signature in presence of two witnesses.

PETER D. HORN.

Witnesses:
 J. S. CORRELL,
 GEORGE NAGLE.